United States Patent
Avigdor et al.

(10) Patent No.: US 9,874,828 B2
(45) Date of Patent: Jan. 23, 2018

(54) ELECTROSTATIC INK COMPOSITIONS

(71) Applicant: Hewlett-Packard Indigo B.V., Amstelveen (NL)

(72) Inventors: Reut Avigdor, Nes Ziona (IL); Nurit Carmel-Barnea, Nes Ziona (IL); Rada Nuchimov, Nes Ziona (IL); Yaron Grinwald, Nes Ziona (IL)

(73) Assignee: Hewlett-Packard Indigo B.V., Amstelveen (NL)

( * ) Notice: Subject to any disclaimer, the term of this patent is extended or adjusted under 35 U.S.C. 154(b) by 0 days.

(21) Appl. No.: 15/026,226

(22) PCT Filed: Oct. 25, 2013

(86) PCT No.: PCT/EP2013/072425
§ 371 (c)(1),
(2) Date: Mar. 30, 2016

(87) PCT Pub. No.: WO2015/058814
PCT Pub. Date: Apr. 30, 2015

(65) Prior Publication Data
US 2016/0246204 A1    Aug. 25, 2016

(51) Int. Cl.
C09D 11/02    (2014.01)
C09D 11/10    (2014.01)
G03G 9/087    (2006.01)
G03G 9/13     (2006.01)
C09D 11/037   (2014.01)
G03G 9/12     (2006.01)
C09D 11/106   (2014.01)
C09D 11/52    (2014.01)

(52) U.S. Cl.
CPC ........... G03G 9/131 (2013.01); C09D 11/037 (2013.01); C09D 11/106 (2013.01); C09D 11/52 (2013.01); G03G 9/122 (2013.01)

(58) Field of Classification Search
CPC ... C09D 11/037; C09D 11/106; C09D 11/107; C09D 11/52; C08K 3/08; C08K 3/0806; C08K 3/0033; G03G 9/122; G03G 6/131
See application file for complete search history.

(56) References Cited

U.S. PATENT DOCUMENTS

| | | | |
|---|---|---|---|
| 3,405,683 A | 10/1968 | Jons et al. | |
| 3,900,003 A | 8/1975 | Sato et al. | |
| 4,073,266 A | 2/1978 | Arneth et al. | |
| 4,342,823 A | 8/1982 | Grant et al. | |
| 4,400,079 A | 8/1983 | Landa | |
| 4,504,138 A | 3/1985 | Kuehnle et al. | |
| 4,690,539 A | 9/1987 | Radulski et al. | |
| 5,026,621 A | 6/1991 | Tsubuko et al. | |
| 5,366,839 A | 11/1994 | Nobuyuki | |
| 5,749,083 A | 5/1998 | Koda et al. | |
| 6,623,902 B1 | 9/2003 | Ben-Avraham et al. | |
| 7,670,742 B2 | 3/2010 | Tsubuko et al. | |
| 8,263,303 B2 | 9/2012 | Matsuoka et al. | |
| 8,404,411 B2 | 3/2013 | Mitsumori et al. | |
| 2006/0222985 A1 | 10/2006 | Tsubuko et al. | |
| 2009/0208250 A1 | 8/2009 | Mitsumori et al. | |
| 2010/0062360 A1* | 3/2010 | Victor | G03G 9/125 430/111.41 |
| 2010/0080916 A1 | 4/2010 | Song et al. | |
| 2011/0217650 A1* | 9/2011 | Mor | C09D 11/03 430/115 |
| 2013/0034809 A1 | 2/2013 | Iwata et al. | |
| 2013/0158187 A1 | 6/2013 | Victor et al. | |

FOREIGN PATENT DOCUMENTS

| | | |
|---|---|---|
| CN | 101765643 | 6/2010 |
| CN | 102639652 | 8/2012 |
| WO | 03009064 | 1/2003 |
| WO | 2007130069 | 11/2007 |
| WO | 2012057800 | 5/2012 |
| WO | 2012105951 | 8/2012 |

OTHER PUBLICATIONS

International Search Report and Written Opinion dated Jun. 20, 2014 for PCT/EP2013/072425 filed Oct. 25, 2013, Applicant Hewlett-Packard Indigo B.V.
Honeywell A-C 5120, Ethylene-Acrylic Acid Copolymer, technical data sheet, issued Jan. 2008, www.honeywell.com/additives, downloaded Oct. 7, 2013.
DuPont Packaging & Industrial Polymers, DuPont Nucrel 699, Nucel resins Product Data Sheet issued Feb. 16, 2011, http://nucrel.dupont.com, downloaded Oct. 7, 2013.
Lotader 4210 info sheet issued Jul. 2004, www.arkemagroup.com, downloaded Oct. 7, 2013.
Lotader 3430 info sheet issued Jul. 2004, www.arkemagroup.com, downloaded Oct. 7, 2013.

(Continued)

Primary Examiner — Irina S Zemel
Assistant Examiner — Jeffrey S Lenihan
(74) Attorney, Agent, or Firm — HP Inc. Patent Department

(57) ABSTRACT

Herein is disclosed an electrostatic ink composition comprising a resin and a conductive pigment, wherein the resin comprises a co-polymer formed from an alkylene monomer, an acrylic ester monomer and a maleic anhydride monomer, wherein, in some examples, the acrylic ester monomer constitutes at least about 8 wt % of the co-polymer. Herein is also disclosed a print substrate having printed thereon an electrostatic ink comprising a resin and a conductive pigment, wherein the resin comprises a co-polymer formed from an alkylene monomer, an acrylic ester monomer and a maleic anhydride monomer, wherein, in some examples, the acrylic ester monomer constitutes at least about 8 wt % of the co-polymer.

14 Claims, No Drawings

(56) References Cited

OTHER PUBLICATIONS

Lotader 3410 info sheet issued Jul. 2004, www.arkemagroup.com, downloaded Oct. 7, 2013.
Lotader 4700 info sheet issued Jul. 2004, www.arkemagroup.com, downloaded Oct. 7, 2013.

\* cited by examiner

ELECTROSTATIC INK COMPOSITIONS

BACKGROUND

Electrostatic printing processes typically involve creating an image on a photoconductive surface, applying an ink having charged particles to the photoconductive surface, such that they selectively bind to the image, and then transferring the charged particles in the form of the image to a print substrate. The photoconductive surface is typically on a cylinder and is often termed a photo-imaging plate (PIP). The photoconductive surface is selectively charged with a latent electrostatic image having image and background areas with different potentials. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, and then to the print substrate. Variations of this method utilize different ways for forming the electrostatic latent image on a photoreceptor or on a dielectric material.

DETAILED DESCRIPTION

Before examples of the electrostatic ink composition and related aspects are disclosed and described, it is to be understood that this disclosure is not limited to the particular process steps and materials disclosed herein because such process steps and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "liquid carrier," "carrier," or "carrier vehicle" refers to the fluid in which the polymers, particles, colorant, charge directors and/or other additives can be dispersed to form a liquid electrostatic ink or electrophotographic ink. Liquid carriers can include a mixture of a variety of different agents, such as surfactants, co-solvents, viscosity modifiers, and/or other possible ingredients.

As used herein, "electrostatic ink composition" generally refers to a ink composition, which may be in liquid form, that is typically suitable for use in an electrostatic printing process, sometimes termed an electrophotographic printing process. The electrostatic ink composition may comprise chargeable particles of a resin, which may be as described herein, dispersed in a liquid carrier, which may be as described herein.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not just pigment colorants, but other pigments such as organometallics, ferrites, ceramics, etc.

As used herein, "co-polymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic(ally) printing" or "electrophotographic(ally) printing" generally refers to the process that provides an image that is transferred from a photo imaging substrate or plate either directly or indirectly via an intermediate transfer member to a print substrate, e.g. a paper substrate. As such, the image is not substantially absorbed into the photo imaging substrate or plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field strength of 1000 V/cm or more, in some examples 1000 V/mm or more.

As used herein, the term "about" is used to provide flexibility to a numerical range endpoint by providing that a given value may be a little above or a little below the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

Unless otherwise stated, any feature described herein can be combined with any aspect or any other feature described herein.

In an aspect, there is provided an electrostatic ink composition comprising a resin and a conductive pigment, wherein the resin comprises a co-polymer formed from an alkylene monomer, an acrylic ester monomer and a maleic anhydride monomer.

In a further aspect, there is provided a print substrate having printed thereon an electrostatic ink comprising a resin and a conductive pigment, wherein the resin comprises a co-polymer formed from an alkylene monomer, an acrylic ester monomer and a maleic anhydride monomer.

In some examples, there is provided an electrostatic ink composition comprising a resin and a conductive pigment, wherein the resin comprises a co-polymer formed from an alkylene monomer, an acrylic ester monomer and a maleic anhydride monomer, wherein the acrylic ester monomer constitutes at least about 8 wt % of the co-polymer. In some examples, there is provided a liquid electrostatic ink composition comprising a liquid carrier, and particles comprising a resin and a conductive pigment dispersed in the liquid carrier, wherein the resin comprises a co-polymer formed from an alkylene monomer, an acrylic ester monomer and a maleic anhydride monomer, and, in some examples, wherein the acrylic ester monomer constitutes at least about 8 wt % of the co-polymer.

In some examples, there is provided a print substrate having printed thereon an electrostatic ink comprising a resin and a conductive pigment, wherein the resin comprises a co-polymer formed from an alkylene monomer, an acrylic ester monomer and a maleic anhydride monomer, wherein the acrylic ester monomer constitutes at least about 8 wt % of the co-polymer.

The co-polymer formed from an alkylene monomer, an acrylic ester monomer and a maleic anhydride monomer may be termed a first co-polymer herein, for brevity. This does not imply that any other co-polymer is present, although a further co-polymer may be present if desired, as described below. In some examples, the acrylic ester monomer constitutes at least about 8 wt % of the first co-polymer. In some examples, the acrylic ester monomer constitutes at least about 12 wt % of the first co-polymer; in some examples at least about 16 wt % of the first co-polymer; in some examples at least about 20 wt % of the first co-polymer. The first monomer may be a random co-polymer of the alkylene monomer, the acrylic ester monomer and the maleic anhydride monomer.

In some examples, the acrylic ester monomer constitutes about 8 wt % to about 35 wt % of the first co-polymer, and, in some examples, the maleic anhydride monomer constitutes about 0.5 wt % to about 5 wt % of the first co-polymer, and, in some examples, the remaining wt % of the co-polymer is the alkylene monomer.

In some examples, the acrylic ester monomer constitutes about 8 wt % to about 35 wt % of the first co-polymer, the maleic anhydride monomer constitutes about 0.5 wt % to about 5 wt % of the first co-polymer, and the remaining wt % of the co-polymer is the alkylene monomer.

In some examples, the alkylene monomer in the first co-polymer is selected from ethylene and propylene. In some examples, the alkylene monomer in the first co-polymer is ethylene.

In some examples, the acrylic ester monomer constitutes about 8 wt % to about 35 wt % of the first co-polymer, the alkylene monomer constitutes about 0.5 wt % to about 5 wt % of the first co-polymer, and the remaining wt % of the first co-polymer is the alkylene monomer, which is ethylene.

In some examples, the first co-polymer has a melting temperature of from 55 to 110° C., as measured by differential scanning calorimetry. In some examples, the first co-polymer has a melting temperature of from 60 to 100° C., as measured by differential scanning calorimetry. In some examples, the first co-polymer has a melting temperature of from 65 to 95° C., as measured by differential scanning calorimetry.

In some examples, the acrylic ester monomer in the first co-polymer is an alkyl acrylate, wherein the alkyl group is selected from a $C_1$ to $C_5$ alkyl group. In some examples, the alkyl group of the alkyl acrylate is selected from methyl, ethyl, propyl and butyl.

In some examples, in the first co-polymer, the acrylic ester monomer is selected from ethyl acrylate, propyl acrylate and butyl acrylate and the alkylene monomer is ethylene.

In some examples, the first co-polymer is a random terpolymer of ethylene, methyl acrylate and maleic anhydride, and, in some examples, it has a melting temperature of from 72° C. to 82° C., as measured by differential scanning calorimetry.

In some examples, the first co-polymer is a random terpolymer of ethylene, butyl acrylate and maleic anhydride, and, in some examples, it has a melting temperature of 86° C. to 96° C., as measured by differential scanning calorimetry.

In some examples, the first co-polymer is a random terpolymer of ethylene, ethyl acrylate and maleic anhydride, and, in some examples, it has a melting temperature of 60° C. to 70° C., as measured by differential scanning calorimetry.

In some examples, the electrostatic ink composition and/or the electrostatic ink printed on the print substrate, further comprises a co-polymer formed from ethylene and a monomer selected from methacrylic acid and acrylic acid. The polymer formed from ethylene and a monomer selected from methacrylic acid and acrylic acid may be termed a second co-polymer herein, for brevity.

In some examples, the monomer selected from methacrylic acid and acrylic acid constitutes from 8 wt % to 20 wt % of the second co-polymer, and in some examples the ethylene constitutes the remaining wt % of the second co-polymer.

In some examples, the first co-polymer, and the second co-polymer are present in the electrostatic ink composition in a relative wt %/wt % amounts of 5:95 to 95:5. In some examples, the first co-polymer, and the second co-polymer are present in the electrostatic ink composition in a relative wt %/wt % amounts of 10:90 to 90:10. In some examples, the first co-polymer, and the second co-polymer are present in the electrostatic ink composition in a relative wt %/wt % amounts of 5:95 to 50:50, in some examples 5:95 to 40:60, in some examples 5:95 to 30:70, in some examples 5:95 to 20:80, in some examples in some examples 5:95 to 15:85.

In some examples, the electrostatic ink composition comprises particles, which may be termed chargeable particles, comprising the first co-polymer and the conductive pigment, and, if present, the second copolymer. In some examples, the first co-polymer and, if present, the second co-polymer may form a coating on the conductive pigment, and, in some examples, the coating partially or completely covers the conductive pigment. In some examples, the electrostatic ink composition comprises particles comprising the first co-polymer and the conductive pigment, and, if present, the second copolymer, and the particles are suspended in a liquid carrier, which may be as described herein. In some examples, the electrostatic ink composition comprises particles comprising the first co-polymer and the conductive pigment, and, if present, the second copolymer, and the particles are in dry, flowable form.

The conductive pigment, in the present application, indicates an electrically conductive pigment. In some examples, the conductive pigment comprises a metal or carbon. The metal may be a metal in elemental form or an alloy of two or more metals. The conductive pigment may comprise a metal selected from aluminium, tin, a transition metal, and alloys of any one of more thereof. The transition metal may be selected from, for example, zinc, copper, silver, gold, nickel, palladium, platinum, and iron. Alloys that may be used include, but are not limited to, brass, bronze, steel and chromium.

The conductive pigment, in any of the aspects herein, may have any three-dimensional shape. In some examples, the conductive pigment is in the form selected from a flake, a sphere, a rod, or approximations thereof. In the present application, a flake may be a shape with a first dimension, which may be termed a thickness, less than the other two dimensions. In some examples, the flake has a thickness of at least 0.01 µm, in some examples a thickness of at least 0.05 µm, in some examples a thickness of at least 0.05 µm, in some examples a thickness of at least 0.1 µm, in some examples a thickness of at least 0.15 µm, in some examples a thickness of at least 0.18 µm. In some examples, the flake has a thickness of 1 µm or less, in some examples a thickness of 0.8 µm or less, in some examples a thickness of 0.5 µm or less, in some examples a thickness of 0.4 µm or less, in some examples a thickness of 0.3 µm or less.

In some examples, the flake has a diameter, measured in a direction perpendicular to the thickness, of at least 1 µm, in some examples a diameter of at least 2 µm, in some examples a diameter of at least 3 µm, in some examples a diameter of at least 4 µm, in some examples a diameter of at least 5 µm, in some examples a diameter of at least 6 µm, in some examples a diameter of at least 7 µm, in some examples a diameter of at least 8 µm. In some examples, the flake has a diameter, measured in a direction perpendicular to the thickness, of 50 µm or less, in some examples a diameter of 40 µm or less, in some examples a diameter of 30 µm or less, in some examples a diameter of 20 µm or less, in some examples a diameter of 15 µm or less.

In some examples, the conductive pigment has an aspect ratio of a diameter (measured in a direction perpendicular to the thickness) to its thickness of n:1, where n is at least 2, in some examples at least 5, in some examples at least 10, in some examples at least 20, in some examples at least 30, in some examples at least 35. In some examples, the conductive pigment has an aspect ratio of a diameter (measured in a direction perpendicular to the thickness) to its thickness of n:1, where n is 100 or less, in some examples n is 80 or less, in some examples n is 70 or less, in some examples n is 60 or less, in some examples n is 50 or less.

In some examples, the conductive pigment constitutes 50% or less by weight of the solids in the electrostatic ink composition, in some examples, 40% or less by weight of the solids in the electrostatic ink composition, in some examples 35% or less by weight of the solids in the electrostatic ink composition, in some examples 30% or less by weight of the solids in the electrostatic ink composition, in some examples 15% or less by weight of the solids in the electrostatic ink composition. In some examples, the conductive pigment, constitutes 12% or less by weight, in some examples 10% or less by weight, in some examples 8% or less by weight of the solids in the electrostatic ink composition. In some examples, the conductive pigment, constitutes 1% or more by weight, in some examples 2% or more by weight, in some examples 4% or more by weight, in some examples 6% or more by weight by weight, in some examples 8% or more by weight, of the solids in the electrostatic ink composition. In some examples, the conductive pigment constitutes from 10% to 50% by weight of the solids in the electrostatic ink composition, in some examples from 10% to 40% by weight of the solids in the electrostatic ink composition, in some examples 15 to 35% by weight of the solids in the electrostatic ink composition.

Liquid Carrier

The electrostatic ink composition can comprise a liquid carrier. Generally, the liquid carrier can act as a dispersing medium for the other components in the electrostatic ink composition. For example, the liquid carrier can comprise or be a hydrocarbon, silicone oil, vegetable oil, etc. The liquid carrier can include, but is not limited to, an insulating, non-polar, non-aqueous liquid that can be used as a medium for toner particles. The liquid carrier can include compounds that have a resistivity in excess of about $10^9$ ohm-cm. The liquid carrier may have a dielectric constant below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

The liquid carrier can constitute about 20% to 99.5% by weight of the electrostatic ink composition, in some examples 50% to 99.5% by weight of the electrostatic ink composition. The liquid carrier may constitute about 40 to 90% by weight of the electrostatic ink composition. The liquid carrier may constitute about 60% to 80% by weight of the electrostatic ink composition. The liquid carrier may constitute about 90% to 99.5% by weight of the electrostatic ink composition, in some examples 95% to 99% by weight of the electrostatic ink composition.

The ink, when printed on the print substrate, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the print substrate contains less than 5 wt % liquid carrier, in some examples, less than 2 wt % liquid carrier, in some examples less than 1 wt % liquid carrier, in some examples less than 0.5 wt % liquid carrier. In some examples, the ink printed on the print substrate is free from liquid carrier.

Resin

The electrostatic ink composition may comprise a thermoplastic resin, which will for brevity be termed a 'resin' herein. The thermoplastic resin may comprise the first co-polymer described herein, and, in some examples, the second co-polymer described herein. A thermoplastic polymer is sometimes referred to as a thermoplastic resin. The thermoplastic resin may coat the conductive pigment. In addition to the first and second polymers, the resin may comprise other polymers, which may be selected from co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethylene ethyl acrylate; polyesters; polyvinyl toluene; polyamides; styrene/butadiene copolymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); glycidyl methacrylate (GMA) terpolymers; ethylene-acrylic acid ionomers and combinations thereof.

The first co-polymer may be selected from the Lotader family of resins (e.g. Lotader 3430, 3410 and 4700) sold by Arkema.

The other co-polymers mentioned herein may be selected from, for example, the Nucrel family of resins (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, sold by DuPont®) and Bynell 2002, Bynell 2014, and Bynell 2020 (sold by DuPont®)).

The resin can constitute about 5 to 90%, in some examples about 50 to 80%, by weight of the solids of the electrostatic ink composition and/or the ink printed on the print substrate.

Charge Director and Charge Adjuvants

The electrostatic ink composition may include a charge director. Producing the electrostatic ink composition may involve adding a charge director at any stage. The charge director may be added to impart a charge of positive or negative polarity on the resin, which may coat the conductive pigment. The resin may coat the conductive pigment and such particles may be termed chargeable particles herein. In some examples, the charge director may be selected from ionic compounds, such as metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. In some examples, the charge director is selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates (e.g. see WO 2007/130069). In some examples, the charge director imparts a negative charge on the chargeable particles. In some examples, the charge director imparts a positive charge on the chargeable particles.

In some examples, the charge director comprises a sulfosuccinate moiety of the general formula $[R_1\text{—O—C(O)CH}_2\text{CH(SO}_3^-)\text{C(O)—O—R}_{2'}]$, where each of $R_{1'}$ and $R_{2'}$ is an alkyl group. In some examples, the charge director comprises nanoparticles of a simple salt and a sulfosuccinate salt of the general formula $MA_n$, wherein M is a metal, n is the valence of M, and A is an ion of the general formula $[R_1\text{—O—C(O)CH}_2\text{CH(SO}_3^-)\text{C(O)—O—R}_{2'}]$, where each of $R_{1'}$ and $R_{2'}$ is an alkyl group, or other charge directors as found in WO2007130069, which is incorporation herein by reference in its entirety. As described in WO2007130069, the sulfosuccinate salt of the general formula $MA_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, $NH_4$, tert-butyl ammonium, $Li^+$, and $Al^{+3}$, or from any sub-group thereof. The simple salt may comprise an anion selected from $SO_4^{2-}$, $PO^{3-}$, $NO_3^-$, $HPO_4^{2-}$, $CO_3^{2-}$, acetate, trifluoroacetate (TFA), $Cl^-$, $Bf$, $F^-$, $ClO_4^-$, and $TiO_3^{4-}$, or from any subgroup thereof. The simple salt may be selected from $CaCO_3$, $Ba_2TiO_3$, $Al_2(SO_4)_3$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, $LiTFA$, $Al_2(SO_4)_3$, $LiClO_4$ and $LiBF_4$, or any sub-group thereof. The charge director may further comprise basic barium petronate (BBP).

In the formula $[R_1\text{—O—C(O)CH}_2\text{CH(SO}_3^-)\text{C(O)—O—R}_{2'}]$, in some examples, each of $R_{1'}$ and $R_{2'}$ is an aliphatic alkyl group. In some examples, each of $R_{1'}$ and $R_{2'}$ independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_{1'}$ and $R_{2'}$ are the same. In some examples, at least one of $R_{1'}$ and $R_{2'}$ is $C_{13}H_{27}$. In some examples, M is Na, K, Cs, Ca, or Ba. The formula $[R_1\text{—O—C(O)CH}_2\text{CH(SO}_3^-)\text{C(O)—O—R}_{2'}]$ and/or the formula $MA_n$ may be as defined in any part of WO2007130069.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20%, in some examples 0.01 to 20% by weight, in some examples 0.01 to 10% by weight, in some examples 0.01 to 1% by weight of the solids of the electrostatic ink composition. In some examples, the charge director constitutes about 0.001 to 0.15% by weight of the solids of the electrostatic ink composition, in some examples 0.001 to 0.15%, in some examples 0.001 to 0.02% by weight of the solids of the electrostatic ink composition.

The electrostatic ink composition may include a charge adjuvant. A charge adjuvant may promote charging of the particles when a charge director is present. The method as described here may involve adding a charge adjuvant at any stage.

The charge director or the charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or comprises aluminum di- or tristearate. The charge adjuvant may be present in an amount of about 0.1 to 5% by weight, in some examples about 0.1 to 1% by weight, in some examples about 0.3 to 0.8% by weight of the solids of the electrostatic ink composition.

In some examples, the chargeable particles further comprise a salt of multivalent cation and a fatty acid anion. The salt of multivalent cation and a fatty acid anion can act as a charge director and/or a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation comprises a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

In some examples, the chargeable particles further comprise a salt of multivalent cation and a fatty acid anion and, in some examples, the composition further comprises a charge director selected from metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, and organic acid esters of polyvalent alcohols. In some examples, the chargeable particles further comprise a salt of multivalent cation and a fatty acid anion and the composition further comprises a charge director selected oil-soluble petroleum sulfonates (e.g. neutral Calcium Petronate™, neutral Barium Petronate™, and basic Barium Petronate™) polybutylene succinimides (e.g. OLOA™1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. In some examples, the chargeable particles further comprise a salt of multivalent cation and a fatty acid anion and the composition further comprises a charge director selected from a sulfosuccinate moiety of the general formula [$R_{1'}$—O—C(O)CH$_2$CH(SO$_3^-$)C(O)—O—$R_{2'}$], where each of $R_{1'}$ and $R_{2'}$ is an alkyl group, which may be as described above.

The charge director or charge adjuvant, which may, for example, be or comprise comprise a salt of multivalent cation and a fatty acid anion, may be present in an amount of 0.1 wt % to 5 wt % of the solids of the electrostatic ink composition, in some examples in an amount of 0.1 wt % to 2 wt % of the solids of the electrostatic ink composition, in some examples in an amount of 0.1 wt % to 2 wt % of the solids of the electrostatic ink composition, in some examples in an amount of 0.3 wt % to 1.5 wt % of the solids of the electrostatic ink composition, in some examples about 0.5 wt % to 1.2 wt % of the solids of the electrostatic ink composition, in some examples about 0.8 wt % to 1 wt % of the solids of the electrostatic ink composition.

Other Additives

The electrostatic ink composition may comprise an additive or a plurality of additives. The additive or plurality of additives may be added at any stage of producing the electrostatic ink composition. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Printing Process and Print Substrate

Also provided is a method of electrophotographic printing an electrostatic ink composition as described herein, wherein the ink composition comprises particles comprising the resin and the conductive pigment, which may be dispersed in a liquid carrier, the method comprising:

forming a latent electrostatic image on a surface;
contacting the surface with the electrostatic ink composition, such that at least some of the particles adhere to the surface to form a developed toner image on the surface, and transferring the toner image to a print substrate.

The surface on which the (latent) electrostatic image is formed or developed may be on a rotating member, e.g. in the form of a cylinder. The surface on which the (latent) electrostatic image is formed or developed may form part of a photo imaging plate (PIP). The method may involve passing the electrostatic ink composition of the invention between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles adhere to the surface of the rotating member. The intermediate transfer member, if present, may be a rotating flexible member, which may be heated, e.g. to a temperature of from 80 to 160° C.

The print substrate may be any suitable substrate. The substrate may be any suitable substrate capable of having an image printed thereon. The substrate may comprise a material selected from an organic or inorganic material. The material may comprise a natural polymeric material, e.g. cellulose. The material may comprise a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The material may comprise a metal, which may be in sheet form. The metal may be selected from or made from, for instance, aluminium (Al), silver (Ag), tin (Sn), copper (Cu), mixtures thereof. In an example, the substrate comprises a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print.

EXAMPLES

The following illustrates examples of the electrostatic ink compositions and other aspects described herein. Thus, these Examples should not be considered as limitations of the present disclosure, but are merely in place to teach how to make examples of the present disclosure.

The 'Lotader' resins used in the following Examples, made by Arkema, are ethylene/acrylic ester/maleic anhydride co-polymers of the general formula:

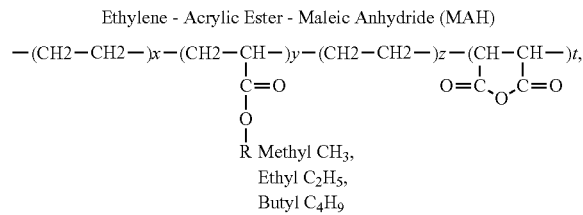

Ethylene - Acrylic Ester - Maleic Anhydride (MAH)

R Methyl $CH_3$,
Ethyl $C_2H_5$,
Butyl $C_4H_9$ in which x, y, z and t are 1 or more. The formula above may itself be a repeat unit in the co-polymers. The resins are typically random co-polymers of the ethylene, acrylic ester and maleic anhydride monomers.

Lotoder® 4210 resin is a random terpolymer of ethylene, butyl acrylate and maleic anhydride. It has a melting temperature of 102° C., as measured by differential scanning calorimetry.

Lotader® 3430 resin is a random terpolymer of ethylene, methyl acrylate and maleic anhydride. It has a melting temperature of 77° C., as measured by differential scanning calorimetry.

Lotader® 3410 resin is a random terpolymer of ethylene, butyl acrylate and maleic anhydride. It has a melting temperature of 91° C., as measured by differential scanning calorimetry.

Lotader® 4700 resin is a random terpolymer of ethylene, ethyl acrylate and maleic anhydride. It has a melting temperature of 65° C., as measured by differential scanning calorimetry.

Resin 'F' used in the following examples is Dupont Nucrel® 699, which is a co-polymer of ethylene and methacrylic acid.

Resin 'ACE' used in the following examples is Honeywell A-C® 5120, which is a co-polymer of ethylene and acrylic acid.

Resins 'F' and 'ACE' can be used as a mixture, and are referred to as resin 'F/ACE'.

In the following examples, 'Isopar' is Isopar™ L Fluid, produced by ExxonMobil and having CAS Number 64742-48-9.

In the examples below, the aluminum flakes had 8 μm diameter and 0.2 μm thickness (#12541 from Schlenk, Ge).

Comparative Example 1 (F/ACE-Based Ink)

The aluminium flakes were added to a grinding chamber (S1—Union Process) with resin (Nucrel 699, available from Dupont and A-C 5120, available from Honeywell, in the relative weight:weight ratio of 70:30), and other additives: 3% Al-distearate, available from Riedel de-Haan (sometimes termed VCA) and the dispersant LUB6406, from Lunbrizol (present in an amount of 10%). The mixture in the grinding chamber was then ground for 5 hours at 35° C. (mixture during grinding contained 18% by weight non volatile solids, with the remaining liquid portion of the mixture being Isopar liquid). After the grinding, the resultant milled composition was then diluted with further Isopar to a 2 wt % solids, charged working dispersion. The aluminium flakes were present at 25 weight % particle loading.

Comparative Example 2 (Lotader-Based Ink)

An ink was prepared as described in Example 1, except that the Nucrel 699 and A-C 5120 resins were replaced with Lotader 4210 resin. The aluminium flakes were again present at 25 weight % particle loading.

The films of printed samples of the inks of (A) Comparative Example 1 at 25% particle loading; and (B) Comparative Example 2 at 25% particle loading the ink-printed area were examined using a scanning electron micrograph. It was observed that the inks of Comparative Example 2 give an excellent film compared to the inks of Comparative Example 1, although some level of jellification is observed with the ink of Example 2. Such jellification increases the viscosity of the ink, but may improve film forming of the printed area. Such film coverage of the image area results in an enhanced metallic look of print samples of the inks of Comparative Example 2, compared with Comparative Example 1.

Table 1 shows a comparison of the basic print parameters (Image Optical Density, Flop Index and Background Optical Density) between the inks of Comparative Example 1 and Example 2. The ink of Comparative Example 2 resulted in silver prints with much better metallic look and less background.

TABLE 1

| | Comparative Example 1 | Comparative Example 2 |
|---|---|---|
| O.D. Image | 0.5 | 0.64 |
| Flop Index | 6.7 | 11 |
| Total O.D. BKG | 0.09 | 0.06 |

A parameter used for indicating BKG level is the ΔE of Yellow at the BKG. The Yellow print following the metallic print collects BKG on blanket and therefore, contains the total BKG of the metallic print. It was shown (in a chosen working point) that there is a correlation between the change (ΔE) in yellow color and the level of metallic output (Flop Index). The ink of Comparative Example 2 shows reduction of BKG by 50% while maintaining the metallic look.

Two possible explanations for the background reduction when using the ink of Example 2 were tested.

1) Better Wetting Between Pigment and Resin

Scanning electron micrographs of the metallic inks of (A) Comparative Example 1 at 35% particle loading and (B) Example 2 at 25% particle loading were examined. It was observed that the ink of Comparative Example 2 had better contact and spreading of the resin on the pigment giving a more homogenous film and a lower level of "free pigment" that resulted in lower BKG.

2) Charging and Background

The variation of AOD from paper with particle charge (PC) for the inks of Comparative Example 1 and Comparative Example 2 was also examined. BKG was measured as ΔOD from paper. It was observed that there was a strong dependency of BKG generation to the ink charging with lower BKG to lower PC.

Comparative Examples 3-5 and Examples 6-11

It was observed that the combination of Lotader 4210 resin with Isopar creates a gel. Such gelation can harm the functionality of the ink in the BID (binary ink development) unit due the increase of ink viscosity. The gelation level can be modified by using different Lotader grades that have different ratios of ester (y) and maleic anhydride (t) in the resin. Such grades, and the ratio of ester to maleic anhydride, are shown in Table 2.

TABLE 2

| Lotader Grade | wt % y | wt % t |
| --- | --- | --- |
| 4210 | 6.5 | 3.6 |
| 3430 | 16 | 3 |
| 3410 | 18 | 3 |
| 4700 | 29 | 1.3 |

Different levels of ester and maleic anhydride affect the gelation and viscosity of the product ink, as will be shown below in relation to the viscosity of the inks.

It was also found that a further route to minimize the gelation effect is combining a Lotader resin with Nucrel 699 (DuPont) [resin 'F'] and AC5120 (Honeywell) [resin 'ACE'] which are polyethylene resins with methacrylic acid moiety and acrylic acid moiety respectively that reduce the gelation effect.

It was an aim to decrease viscosity in order to get better performance on the electrostatic printing press, as well as better metallic appearance with low background (due to low PC). It was found that Lotader 4210 resulted in very high viscosity values because of the gelation effect. Therefore, very large particle size was obtained, regarding the metallic appearance, a high Flop Index and relatively low BKG was observed.

Further electrostatic ink compositions were formulated according to the method of Comparative Example 1, except that the resin compositions used in Table 3 were used in the ratio in brackets, if applicable.

Table 3 shows that mix of Lotader 4210 with 'F' resin in different ratios did not provide any benefit and the viscosity remained very high. Later, experiments were made with new Lotader grades (and mixing with F resin), in order to decrease viscosity and PC values. Some of these examples with Lotader 4700 have significantly lower viscosity and PC values, as shown in the Table 3.

TABLE 3

| Example | Resin Formulation | Optical Density | Flop Index | Optical Density BKG | PS | Particle Charge | Viscosity (Cp) |
| --- | --- | --- | --- | --- | --- | --- | --- |
| Comp. 1 | F/ACE based ink | 0.45 | 6.27 | 0.22 | 7.15 | 177 | 300 |
| Comp. 2 | 100% Lotader 4210 | 0.64 | 11 | 0.19 | 8.7 | 90 | 1900 |
| Comp. 3 | Lotader 4210:F (70:30) | 0.48 | 8 | 0.17 | 8.691 | 105 | 1850 |
| Comp. 4 | Lotader 4210:F (50:50) | 0.4 | 5 | 0.14 | 7.731 | 126 | 1350 |
| Ex. 5 | 100% Lotader 3410 | 0.65 | 11.4 | 0.16 | 18.48 | 48 | 410 |
| Ex. 6 | Lotader 3410:F (70:30) | 0.6 | 8 | 0.2 | 12.13 | 343 | 350 |
| Ex. 7 | Lotader 3410:F/ACE (50:50) | 0.57 | 8 | 0.19 | 8.39 | 171 | 390 |
| Ex. 8 | F:Lotader 4700 90:10 | 0.44 | 7 | 0.18 | 7.734 | 90 | 20 |
| Ex. 9 | F:Lotader 4700 (80:20) | 0.48 | 6.7 | 0.18 | 9.521 | 34 | 100 |
| Ex. 10 | F:Lotader 4700 (70:30) | 0.45 | 5.7 | 0.17 | 9.132 | 331 | 200 |

While the compositions and related aspects have been described with reference to certain embodiments, those skilled in the art will appreciate that various modifications, changes, omissions, and substitutions can be made without departing from the spirit of the disclosure. It is intended, therefore, that the compositions and related aspects be limited by the scope of the following claims. The features of any dependent claim can be combined with the features of any of the other dependent claims, and any independent claim.

The invention claimed is:

1. An electrostatic ink composition comprising a conductive metal pigment, and about 50% to 80% by weight, with respect to the total solids in the electrostatic ink composition, of a resin, wherein the resin is a combination of i) a first co-polymer formed from an alkylene monomer, an acrylic ester monomer and a maleic anhydride monomer, wherein the acrylic ester monomer constitutes at least 8 wt % of the monomers forming the first co-polymer, and ii) a second co-polymer formed from ethylene and a monomer selected from methacrylic acid and acrylic acid.

2. An electrostatic ink composition according to claim 1, wherein the acrylic ester monomer constitutes at least about 12 wt % of the monomers forming the first co-polymer.

3. An electrostatic ink composition according to claim 1, wherein the acrylic ester monomer constitutes at least about 16 wt % of the monomers forming the first co-polymer.

4. An electrostatic ink composition according to claim 1, wherein the acrylic ester monomer constitutes at least about 20 wt % of the monomers forming the first co-polymer.

5. An electrostatic ink composition according to claim 1, wherein the acrylic ester monomer constitutes 8 wt % to about 35 wt % of the monomers forming the first co-polymer.

6. An electrostatic ink composition according to claim 5, wherein the maleic anhydride monomer constitutes about 0.5 wt % to about 5 wt % of the monomers forming the first co-polymer, and the remaining wt % of the monomers forming the first co-polymer is the alkylene monomer.

7. An electrostatic ink composition according to claim 6, wherein the alkylene monomer is ethylene.

8. An electrostatic ink composition according to claim 1, wherein the acrylic ester monomer is an alkyl acrylate, wherein the alkyl group is selected from a $C_1$ to $C_5$ alkyl group.

9. An electrostatic ink composition according to claim 8, wherein the alkyl group of the alkyl acrylate is selected from methyl, ethyl, propyl and butyl.

10. An electrostatic ink composition according to claim 1, wherein the monomer selected from methacrylic acid and acrylic acid constitutes from 8 wt % to 20 wt % of the monomers forming the second co-polymer.

11. An electrostatic ink composition according to claim 1, wherein the first co-polymer and the second co-polymer are present in a relative wt %/wt % amounts of 20:80 to 80:20.

12. An electrostatic ink composition according to claim 1, wherein the conductive metal pigment comprises a metal selected from aluminium, tin, a transition metal, and alloys of any one or more thereof.

13. An electrostatic ink composition according to claim 12, wherein the conductive metal pigment is in the form of flakes.

14. A print substrate having printed thereon an electrostatic ink comprising a conductive metal pigment, and about 50% to 80% by weight, with respect to the total solids in the electrostatic ink, of a resin, wherein the resin is a combination of i) a first co-polymer formed from an alkylene monomer, an acrylic ester monomer and a maleic anhydride monomer, wherein the acrylic ester monomer constitutes at least 8 wt % of the monomers forming the first co-polymer, and ii) a second co-polymer formed from ethylene and a monomer selected from methacrylic acid and acrylic acid.

* * * * *

UNITED STATES PATENT AND TRADEMARK OFFICE
CERTIFICATE OF CORRECTION

PATENT NO. : 9,874,828 B2  
APPLICATION NO. : 15/026226  
DATED : January 23, 2018  
INVENTOR(S) : Reut Avigdor et al.

Page 1 of 1

It is certified that error appears in the above-identified patent and that said Letters Patent is hereby corrected as shown below:

On the Title Page

In item (72), Inventors, in Column 1, Line 1, delete "Nes Ziona" and insert -- Ness Ziona --, therefor.

In item (72), Inventors, in Column 1, Line 2, delete "Nes Ziona" and insert -- Ness Ziona --, therefor.

In item (72), Inventors, in Column 1, Line 3, delete "Nes Ziona" and insert -- Ness Ziona --, therefor.

In item (72), Inventors, in Column 1, Line 4, delete "Nes Ziona" and insert -- Ness Ziona --, therefor.

Signed and Sealed this  
Twenty-fourth Day of July, 2018

Andrei Iancu  
*Director of the United States Patent and Trademark Office*